(12) United States Patent
Huang et al.

(10) Patent No.: US 12,523,789 B2
(45) Date of Patent: Jan. 13, 2026

(54) ENERGY SPECTRUM-DOSE MEASURING METHOD AND DEVICE

(71) Applicants: National Institute of Metrology, China, Beijing (CN); Sun Yat-Sen University, Guangzhou (CN)

(72) Inventors: Jianwei Huang, Beijing (CN); Dehong Li, Beijing (CN); Lei Cao, Guangzhou (CN); Xuan Zhang, Beijing (CN); Xiaole Zhang, Beijing (CN); Yaofeng Zhang, Beijing (CN); Chuanfeng Liu, Beijing (CN); Jian Zhang, Beijing (CN); Zhan Liu, Beijing (CN); Yang Yang, Beijing (CN)

(73) Assignees: National Institute of Metrology, China, Beijing (CN); Sun Yat-Sen University, Guangzhou (CN)

( * ) Notice: Subject to any disclaimer, the term of this patent is extended or adjusted under 35 U.S.C. 154(b) by 334 days.

(21) Appl. No.: 18/286,848

(22) PCT Filed: Apr. 10, 2023

(86) PCT No.: PCT/CN2023/087228
§ 371 (c)(1),
(2) Date: Oct. 13, 2023

(87) PCT Pub. No.: WO2023/202398
PCT Pub. Date: Oct. 26, 2023

(65) Prior Publication Data
US 2025/0085446 A1 Mar. 13, 2025

(30) Foreign Application Priority Data
Apr. 18, 2022 (CN) .......................... 202210405305.5

(51) Int. Cl.
*G01T 1/40* (2006.01)
*G01T 1/02* (2006.01)

(52) U.S. Cl.
CPC ................ *G01T 1/40* (2013.01); *G01T 1/023* (2013.01)

(58) Field of Classification Search
CPC .................................. G01T 1/40; G01T 1/023
See application file for complete search history.

(56) References Cited

FOREIGN PATENT DOCUMENTS

| CN | 106873019 A | * | 6/2017 | ............ G01T 1/023 |
| CN | 107862747 A | * | 3/2018 | ............ G01T 1/38 |

* cited by examiner

*Primary Examiner* — David J Makiya
*Assistant Examiner* — Fani Polyzos Boosalis
(74) *Attorney, Agent, or Firm* — CM Law PLLC; Robert C. Klinger

(57) ABSTRACT

An energy spectrum-dose measuring method and device is provided. The method includes: performing energy calibration on a spectrometer using a standard radiation source to obtain a conversion relation between a channel and an energy, where the conversion relation is represented by a calibration factor; measuring ray peaks of n radiation sources with different energies, and dividing energy of an obtained energy spectrum into n regions; performing spectrum collection on the n radiation sources according to the n regions to obtain n net energy spectra subjected to the energy calibration through the calibration factor; performing dose measurement on the n radiation sources sequentially to obtain n dose rates corresponding to the n net energy spectra; calculating a relationship between counting rates of the radiation sources in the n regions and corresponding dose rates; and calculating a full-spectrum dose rate according to a current dose rate of each region.

9 Claims, 5 Drawing Sheets

ENERGY SPECTRUM-DOSE MEASURING METHOD AND DEVICE

CROSS-REFERENCE TO RELATED APPLICATION

This patent application is a national stage of International Application No. PCT/CN2023/087228, filed on Apr. 10, 2023, which claims the priority of Chinese Patent Application No. 202210405305.5 filed with the China National Intellectual Property Administration on Apr. 18, 2022 and entitled as "ENERGY SPECTRUM-DOSE MEASURING METHOD AND DEVICE". Both of the aforementioned applications are incorporated by reference herein in their entireties.

TECHNICAL FIELD

The present disclosure relates to the technical field of data processing, in particular to an energy spectrum-dose measuring method and device.

BACKGROUND

At present, instruments for measuring a γ radiation dose rate commonly used in the field of environmental radiation monitoring include a GM counter tube, a high-pressure ionization chamber, a semiconductor-based dosimeter and a scintillator-based dosimeter. Such dosimeters measure the dose (rate) through the linear conversion of the radiation count and the dose, but they have the problem of poor energy response due to their inherent reasons such as structural design. In addition, there are dose rate meters based on X/γ spectrometers, most of which use an energy spectrum-dose conversion method to make up/correct the energy response.

The energy spectrum-dose conversion method is to obtain the dose rate by solving the measured energy spectrum through a certain algorithm. At present, the commonly used energy spectrum-dose conversion methods include a G(E) function method, a BECK method, a stripping method and a total counting rate method, etc. The solution processes of these methods are complicated, and some methods are suitable for specific environment and lack universality for the radiation environment. The BECK method to perform calculation by a characteristic γ spectral line of a certain nuclide, which requires high spectral resolution and is difficult to use in a complex environment. The stripping method converts an energy spectrum into a fluence spectrum by convolution, and solves the dose rate by the fluence spectrum. This method needs to characterize a detector and its energy response, and the calculation process is relatively time-consuming and inefficient. The total counting rate method converts the dose rate through the absorbed dose rate of air in a certain energy region in direct proportion to the total counting rate. This method is simple, suitable for a simple environment, but not suitable for a complex environment. The key of the G function method lies in the solution of a conversion coefficient G, and its common solutions mainly include a least square method and a conjugate gradient method:

$$G = \sum_{k=1}^{k} A_k \log E^{k-1}.$$

In this solution, a polynomial expansion is constructed by the least square method to express G, as shown in the above formula. The unknown coefficients in the polynomial are solved by the conjugate gradient method, and finally the conversion coefficient G is obtained. In the use process, there are some problems such as complex construction of the G function, the complex deconvolution process, an unstable solution result and non-convergence. Therefore, there are some difficulties in application.

SUMMARY

An objective of embodiments of the present disclosure is to provide an energy spectrum-dose measuring method and device, so as to solve various problems existing in the energy spectrum-dose measuring method in the prior art.

A first aspect of the present disclosure provides an energy spectrum-dose measuring method, including:
performing energy calibration on a spectrometer using a standard radiation source to obtain a conversion relation between a channel and an energy, where the conversion relation is represented by a calibration factor;
measuring ray peaks of n radiation sources with different energies, and dividing energy of an obtained energy spectrum into n regions, where each region at least has a full-energy peak of one ray, and n is a number of radiation sources with different energies;
performing spectrum collection on the n radiation sources according to the n regions to obtain n net energy spectra subjected to the energy calibration through the calibration factor;
performing dose measurement on the n radiation sources sequentially to obtain n dose rates corresponding to the n net energy spectra; and
calculating a relationship between counting rates of the radiation sources in the n regions and corresponding dose rates, where the relationship includes n energy spectrum-dose conversion coefficients to construct an energy spectrum-dose function.

In a possible implementation, the method further includes:
performing spectrum collection on a current radiation source using the spectrometer to obtain a current net energy spectrum;
dividing the current net energy spectrum according to the n regions to obtain a counting rate of each region, and calculating a current dose rate of each region according to the energy spectrum-dose function and the counting rate of each region; and
calculating a full-spectrum dose rate according to the current dose rate of each region.

In a possible implementation, the performing spectrum collection on the n radiation sources according to the n regions to obtain n net energy spectra subjected to the energy calibration through the calibration factor includes:
selecting n radiation sources corresponding to different X-ray tube voltages, performing background spectrum collection on an environment using the spectrometer to obtain n background spectra, and performing spectrum collection on the n radiation sources using the spectrometer to obtain energy spectra of the n radiation sources;
obtaining the n net energy spectra according to differences between the energy spectra of the n radiation sources and the n background spectra.

In a possible implementation, prior to the calculating a relationship between counting rates of the radiation sources in the n regions and corresponding dose rates, where the relationship includes n energy spectrum-dose conversion coefficients, the method further includes:

calculating dose rates of the n radiation sources.

In a possible implementation, the calculating dose rates of the n radiation sources includes:

measuring an accumulated charge in a predetermined time for each of the n radiation sources through a cavity ionization chamber;

calculating an ionization current according to a relationship between the accumulated charge and the predetermined time;

calculating the dose rates according to a relationship between the ionization current and a calibration factor of the ionization chamber.

In a possible implementation, the calculating a relationship between counting rates of the radiation sources in the n regions and corresponding dose rates, where the relationship includes n energy spectrum-dose conversion coefficients to construct an energy spectrum-dose function, includes:

performing discretization processing on the dose rates, the counting rates and the energy spectrum-dose conversion coefficients, which is represented as a first expression for solving the n energy spectrum-dose conversion coefficients;

converting the first expression to obtain a second expression;

converting the second expression according to the counting rates to obtain a third expression;

solving the third expression to obtain the n energy spectrum-dose conversion coefficients.

In a possible implementation, the solving the third expression to obtain the n energy spectrum-dose conversion coefficients includes:

solving a current energy spectrum-dose conversion coefficient based on previous energy spectrum-dose conversion coefficients, until an n-th energy spectrum-dose conversion coefficient is obtained.

In a second aspect, the present disclosure provides an energy spectrum-dose measuring device, including:

a spectrometer calibration module, configured to perform energy calibration on a spectrometer using a standard radiation source to obtain a conversion relation between a channel and an energy, where the conversion relation is represented by a calibration factor;

an energy region grouping module, configured to measure ray peaks of n radiation sources with different energies, and divide energy of an obtained energy spectrum into n regions, where each region at least has a full-energy peak of one ray, and n is a number of radiation sources with different energies;

a spectrum collection module, configured to perform spectrum collection on the n radiation sources according to the n regions to obtain n net energy spectra subjected to the energy calibration through the calibration factor;

a measuring module, configured to perform dose measurement on the n radiation sources sequentially to obtain n dose rates corresponding to the n net energy spectra;

a conversion coefficient solving module, configured to calculate a relationship between counting rates of the radiation sources in the n regions and corresponding dose rates, where the relationship includes n energy spectrum-dose conversion coefficients to construct an energy spectrum-dose function.

In a possible implementation, the spectrum collection module is further configured to perform spectrum collection on a current radiation source using the spectrometer to obtain a current net energy spectrum.

The energy region grouping module is further configured to divide the current net energy spectrum according to the n regions to obtain a counting rate of each region, and calculate a current dose rate of each region according to the energy spectrum-dose function and the counting rate of each region.

The device further includes a calculating module, configured to calculate a full-spectrum dose rate according to the current dose rate of each region.

By applying the energy spectrum-dose measuring method according to the present disclosure, the energy spectrum-dose conversion coefficient is solved using a convolution-free full-spectrum conversion method. Considering that the counting rates of different energies have different weights on the dose rate, the energy of the energy spectrum is divided to solve the conversion coefficient, which effectively improves the energy response problem in the dose test of spectrometer detectors. There is no need to perform deconvolution on the energy spectrum, which greatly reduces the calculation time and improves the calculation efficiency: The convolution-free full-spectrum conversion method is used to solve the energy spectrum-dose conversion coefficient, which solves the problems of an unstable solution result and non-convergence. Moreover, the solution result of the dose rate is not limited by complex environmental conditions, and has a wider applicability.

DETAILED DESCRIPTION OF THE EMBODIMENTS

The present disclosure will be further described in detail with the attached drawings and embodiments hereinafter. It can be understood that the specific embodiments described here are only used to explain the present disclosure, rather than limit the present disclosure. In addition, it should be noted that, for the convenience of description, only the parts related to the present disclosure are shown in the attached drawings.

It should be noted that the embodiments in the present disclosure and the features in the embodiments can be combined with each other without conflict. The present disclosure will be described in detail with reference to the attached drawings and embodiments.

Embodiment 1

Figure 1:
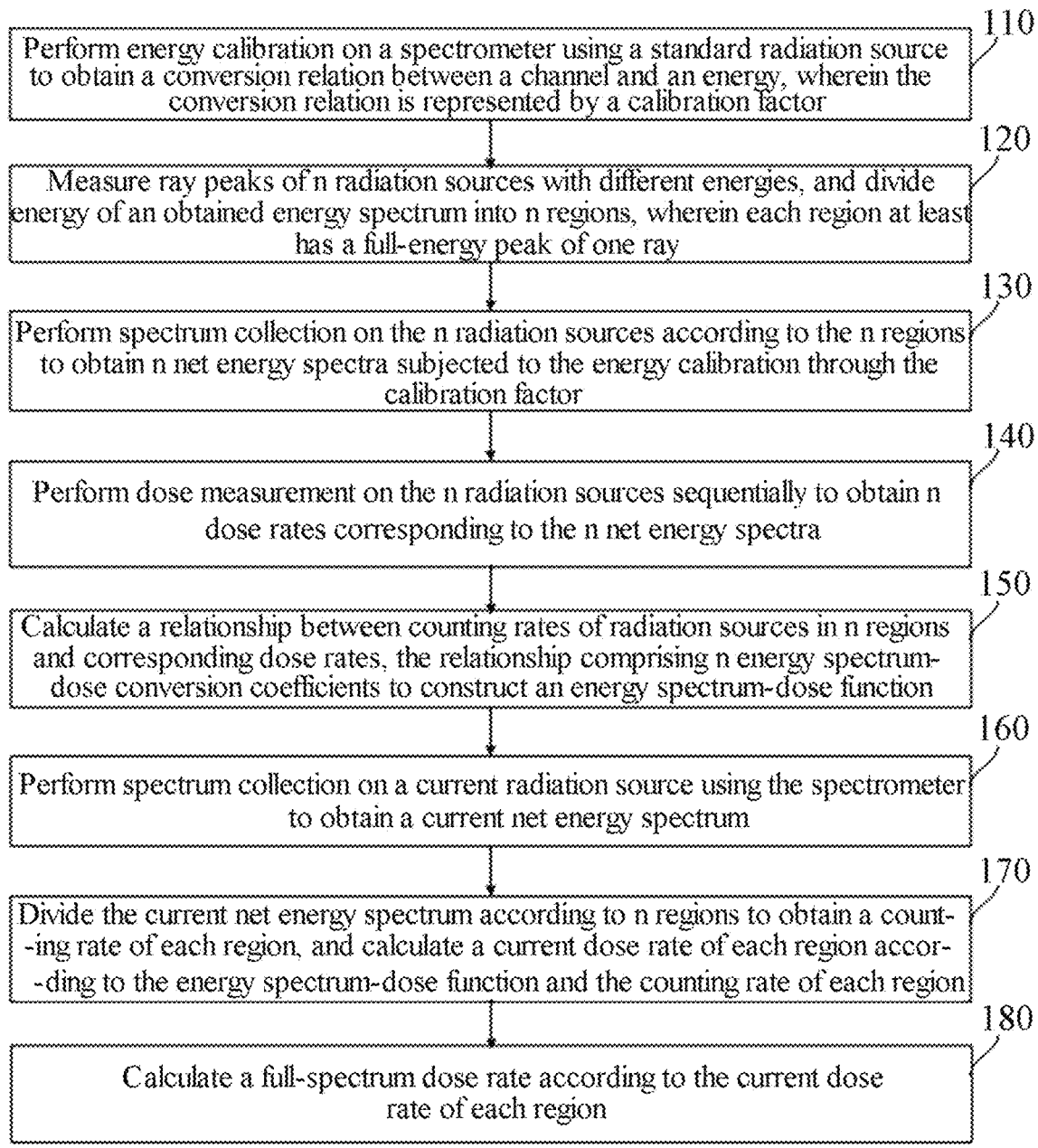
FIG. 1 is a flow chart of an energy spectrum-dose measuring method according to Embodiment 1 of the present disclosure.

FIG. 1 is a flow chart of an energy spectrum-dose measuring method according to Embodiment 1 of the present disclosure. As shown in FIG. 1, the present disclosure includes the following steps 110-180.

In Step 110, energy calibration is performed on a spectrometer using a standard radiation source to obtain a conversion relation between a channel and the energy, where the conversion relation is represented by a calibration factor.

The full-energy peak of the standard radiation source can correspond to the channel of the energy spectrum to obtain the conversion relation between the channel and the energy: When calibrating the spectrometer, in order to improve the accuracy of the subsequent conversion relation, no less than five energy points are used for calibration operation. At each energy point, a group of channels and energies can be obtained, and the calibration coefficient therebetween can be obtained according to multiple groups of channels and energies. The calibration coefficient can be represented in a linear relationship. The subsequent calibration factor of the spectrometer is used to calibrate the spectrometer.

Specifically, by way of example, but not limitation, the present disclosure can use a high-purity germanium spectrometer to perform spectrum collection operation on a standard radiation source. Since the full-energy peak energy of the standard radiation source is known, the full-energy peak energy of the standard radiation source corresponds to the channel of the energy spectrum measured by the high-purity germanium spectrometer to obtain the corresponding conversion relation between the channel and the energy, that is, the calibration coefficient of the channel and the energy:

$$\text{Energy} = a \cdot \text{channel} + b, \quad (1)$$

where Energy represents energy, channel represents a channel, a represents a first parameter in the conversion relation, and b represents a second parameter in the conversion relation. a and b are collectively referred to as calibration coefficients.

It should be noted that the present disclosure uses a high-purity germanium spectrometer for energy spectrum measurement. Other spectrometer detectors can be used for energy spectrum measurement in specific applications. Other spectrometer detectors include, but are not limited to, semiconductor detectors (such as gold-silicon surface barrier detectors) and scintillator detectors (such as sodium iodide detectors and lanthanum bromide detectors).

In Step 120, ray peaks of n radiation sources with different energies are measured, and the energy of the obtained energy spectrum is divided into n regions, where each region at least has a full-energy peak of one ray.

Figure 2:
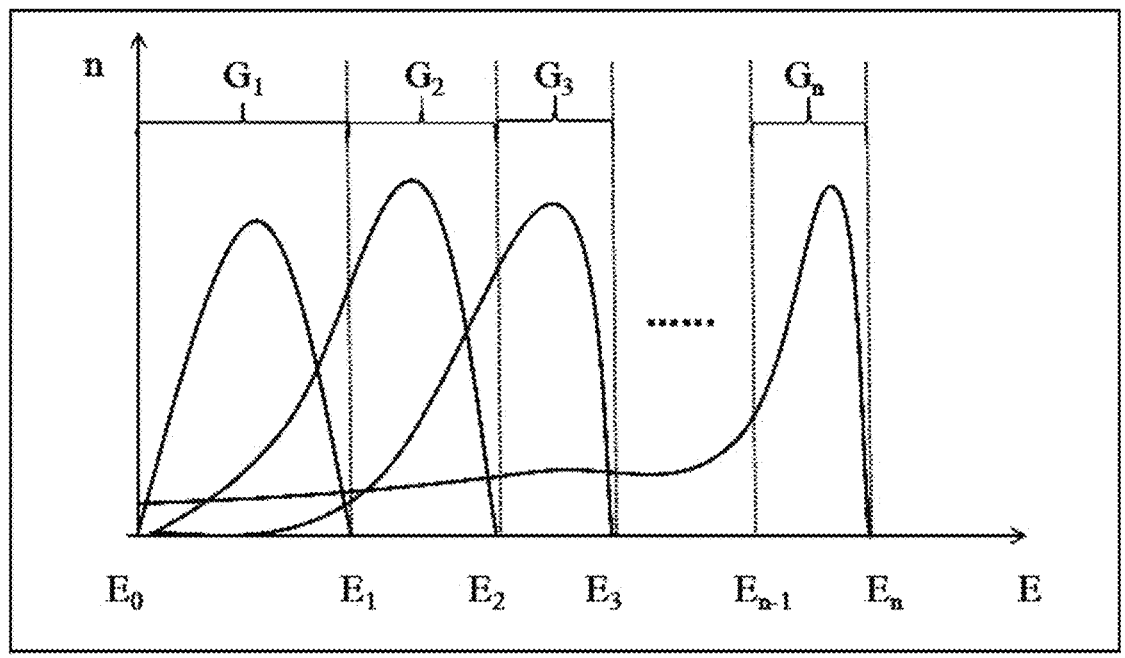
FIG. 2 is a schematic diagram of dividing an energy region.

Specifically, according to the actual conditions, the energy region of the whole energy spectrum is divided into n regions, and each region at least needs a full-energy peak of one ray, as shown in FIG. 2. Therefore, n regions at least need ray peaks of n radiation source (γ/X) with different energies. Table 1 is an example of dividing energy regions, as shown in Table 1.

TABLE 1

Schematic table of dividing energy regions

| Sequence | Energy region/MeV |
|---|---|
| 1 | 0.01-0.045 |
| 2 | 0.045-0.055 |
| 3 | 0.055-0.07 |
| 4 | 0.07-0.1 |
| 5 | 0.1-0.125 |
| 6 | 0.125-0.14 |
| 7 | 0.14-0.7 |
| 8 | 0.7-3 |

In Step 130, spectrum collection is performed on the n radiation sources according to the n regions to obtain n net energy spectra subjected to the energy calibration through the calibration factor.

Figure 3:
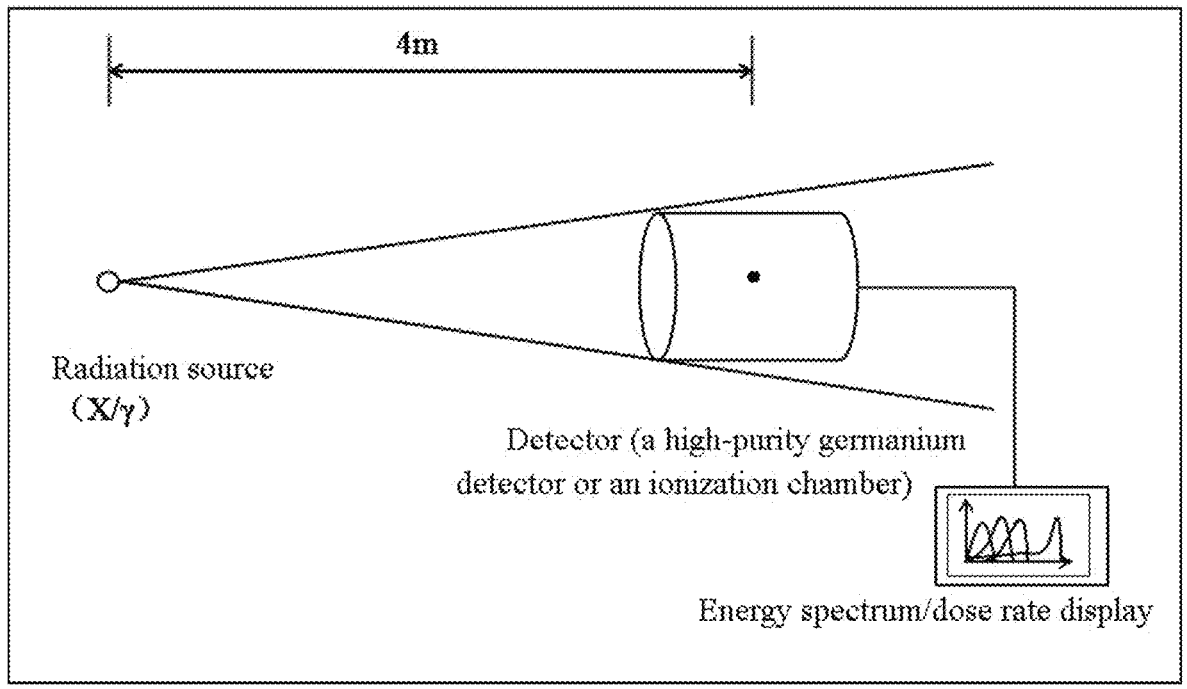
FIG. 3 is a schematic diagram of the layout of a radiation source and a spectrometer.

Specifically, the energy regions are divided according to Step 120. As shown in FIG. 3, the spectra of n radiation sources (X/γ) in different energy regions are collected using a high-purity germanium spectrometer calibrated by a calibration factor. The net energy spectra obtained by the spectrometer are all the net energy spectra after the energy is calibrated using the calibration factor obtained in Step 110.

How to obtain the net energy spectra is explained in detail hereafter.

In a specific embodiment, the type of the selected ray source is first determined. By way of example, but not limitation, X-ray radiant matters with X-ray tube voltages of 45 kV, 55 kV, 70 KV, 100 kV, 125 kV and 140 kV and Cs-137 (0.662 MeV) and Co-60 (1.17 MeV, 1.33 MeV) γ-ray sources can be selected. The energy spectrum is measured by a high-purity germanium spectrometer.

Second, background spectrum collection is performed on an environment, in which the background spectrum is denoted as $sp_b$.

Specifically, when measuring, the radiation source to be measured is removed, and other geometric conditions are unchanged. Measurement is carried out using a spectrometer. The spectrum measured under such conditions is the background spectrum $sp_b$.

Again, as shown in FIG. 3, radiation sources are placed according to specific geometric conditions, and the spectrometer is used to detect each ray source so to obtain an energy spectrum, which is denoted as $sp_r$. For example, every solid curve in FIG. 2 can be regarded as the energy spectrum corresponding to a specific radiation source. Taking the E0-E1 curve in FIG. 2 as an example, the upper energy limit of the energy spectrum distribution is E1. That is, accordingly, one division point of energy region can be defined as E1, and so on.

Finally, the net energy spectra after deducting the background from the energy spectrum $sp_r$ is sp, and the calculation formula of the net energy spectra sp is as follows:

$$sp = sp_r - sp_b. \quad (2)$$

In the present disclosure, the spectra of n radiation sources are sequentially collected to finally obtain n net energy spectra which are sequentially denoted as $sp_1$, $sp_2$, ... $sp_n$. In order to avoid the influence of dead time on the measurement results, the dead time rate of the high-purity germanium spectrometer should not be higher than 10% during energy spectrum measurement.

In Step 140, dose values of the n radiation sources are sequentially measured to obtain n dose rates corresponding to the n net energy spectra.

Figure 4:
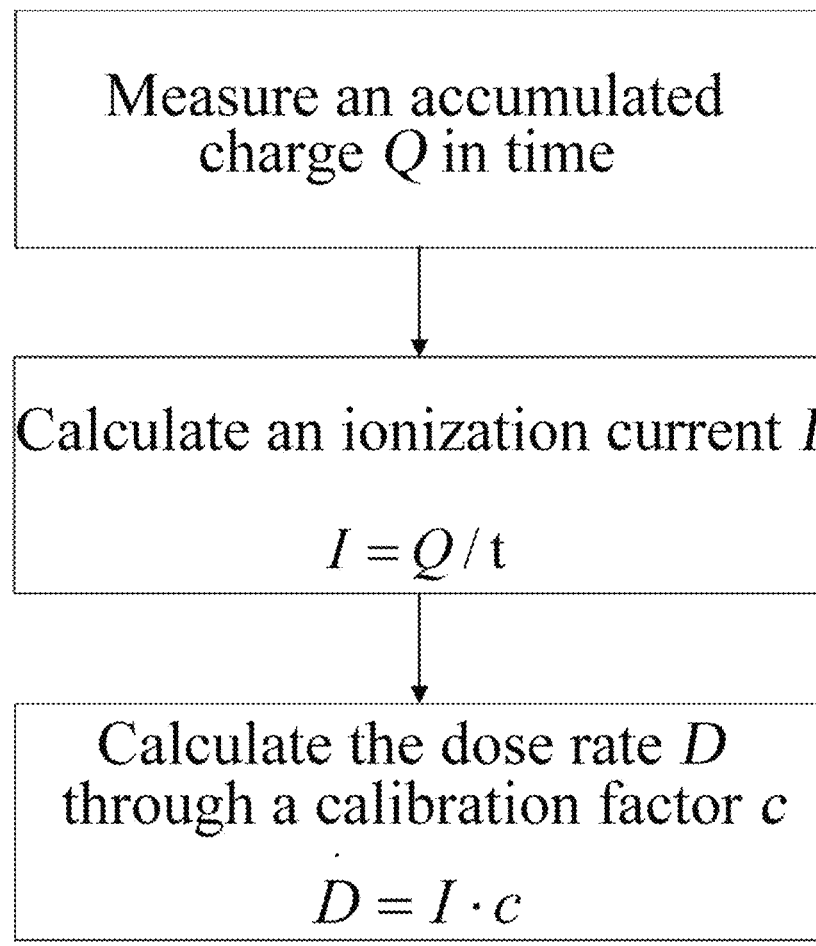
FIG. 4 is a flow chart of measuring a dose rate.

Specifically, as shown in FIG. 4, for each of the n radiation sources, an accumulated charge in a preset time is measured through a cavity ionization chamber; an ionization current is calculated according to the relationship between the accumulated charge and the preset time; and the dose rate is calculated according to the relationship between the ionization current and the calibration factor of the ionization chamber.

Figure 5:
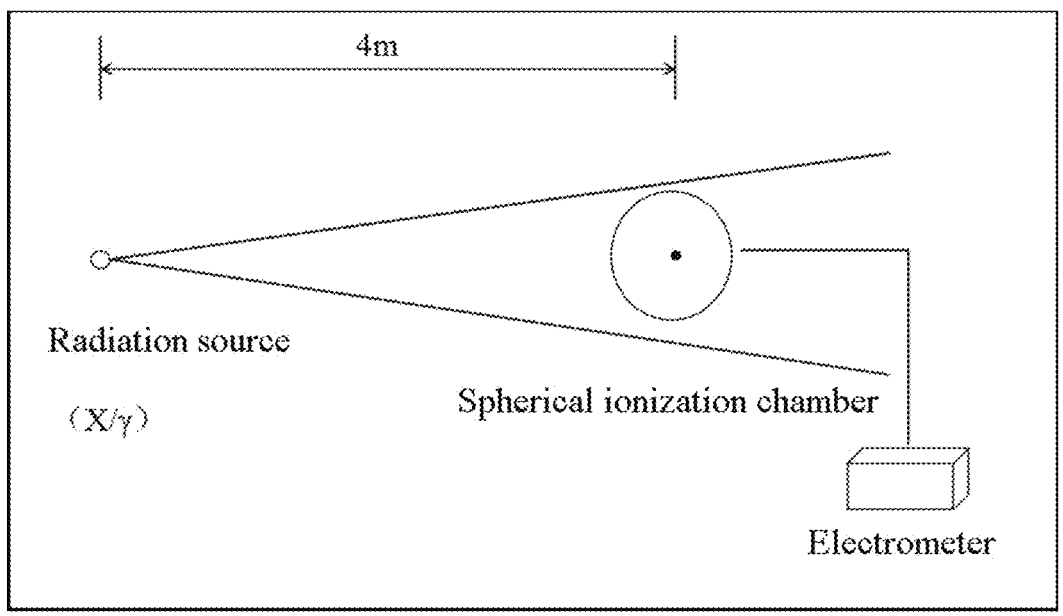
FIG. 5 is a schematic diagram of the layout of a radiation source and an ionization chamber.

By way of example, but not limitation, a cavity ionization chamber with a sensitive volume of 10 L and an electrometer can be used to measure the dose (rate) value of the radiation source (X/γ). As shown in FIG. 5, the ionization chamber is placed at the position of the high-purity germanium detector, and the electrometer is placed at the position of the energy spectrum and dose display region. That is, the position of the equivalent center of the ionization chamber in the radiation field is the same as (overlapped with) that of the equivalent center of the high-purity germanium detector in the radiation field.

When measuring the dose rate, as shown in FIG. 4, the measurement time t is set, and the accumulated charge Q in the time t is acquired through the cavity ionization chamber, where the Q value is read out by the electrometer. Ionization current is the amount of charge per unit time, so that the ionization current I is calculated by Formula (3). The dose rate is converted from the ionization current, the ionization current I is converted into dose rate Ḋ using the calibration coefficient c (known) of the cavity ionization chamber, and the calculation is shown in Formula (4):

$$I = Q/t, \quad (3)$$

$$\dot{D} = I \cdot c. \quad (4)$$

Specifically, the calibration coefficient is calculated under different L-series standard radiant matters sequentially. Because the average energy of each standard radiant matter is known, the correspondence between the energy and the calibration coefficient can be obtained. In the subsequent dose rate measurement, the calibration coefficient of the corresponding ionization chamber is obtained according to the linear interpolation of energy.

According to the example of dividing energy regions in Step 120, the dose (rate) values of n radiation sources (X-ray/γ-ray) in Step 130 are measured sequentially, and finally n dose rates corresponding to the energy spectrum can be obtained.

The energy spectrum and the dose can be obtained through Steps 110-130, as shown in Table 2.

TABLE 2

List in which the energy spectrum is corresponding to the dose rate

| Sequence | Energy region division | Energy spectrum | Dose rate |
|---|---|---|---|
| 1 | $E_1$ | $Sp_1$ | $D_1$ |
| 2 | $E_2$ | $Sp_2$ | $D_2$ |
| 3 | $E_3$ | $Sp_3$ | $D_3$ |
| 4 | $E_4$ | $Sp_4$ | $D_4$ |
| ... | ... | ... | ... |

TABLE 2-continued

List in which the energy spectrum is corresponding to the dose rate

| Sequence | Energy region division | Energy spectrum | Dose rate |
|---|---|---|---|
| n − 1 | $E_{n-1}$ | $Sp_{n-1}$ | $D_{n-1}$ |
| n | $E_n$ | $Sp_n$ | $D_n$ |

An example of the energy spectrum and the dose based on energy region division in Step 120 is shown in Table 3.

TABLE 3

List of examples in which the energy spectrum is corresponding to the dose rate

| Sequence | Energy region division | Energy spectrum | Dose rate |
|---|---|---|---|
| 1 | 45 kV | $Sp_1$ | $D_1$ |
| 2 | 55 kV | $Sp_2$ | $D_2$ |
| 3 | 70 kV | $Sp_3$ | $D_3$ |
| 4 | 100 kV | $Sp_4$ | $D_4$ |
| 5 | 125 kV | $Sp_5$ | $D_5$ |
| 6 | 140 kV | $Sp_6$ | $D_6$ |
| 7 | Cs-137 (0.662 MeV) | $Sp_7$ | $D_7$ |
| 8 | Co-60 (1.17 MeV, 1.33 MeV) | $Sp_8$ | $D_8$ |

In Step 150, a relationship between counting rates of the radiation sources in the n regions and corresponding dose rates is calculated, where the relationship includes n energy spectrum-dose conversion coefficients to construct an energy spectrum-dose function.

Specifically, the method of obtaining the dose rate by piecewise weighted integration of the energy spectrum count using the G(E) function method is expressed in Formula (5):

$$\overset{g}{\dot{D}} = \int_{E_1}^{E_2} G(E) \cdot n(E) \cdot dE \quad (5)$$

where Ḋ is a dose rate of air; n(E) is a counting rate of the energy spectrum; G is an energy spectrum-dose conversion coefficient.

It can be seen from Formula (5) that the key point of solving the dose rate lies in solving G.

In the present disclosure, a plurality of groups of [energy spectrum-dose rate] data pairs $(sp_1\text{-}D_1, sp_2\text{-}D_2, \ldots, sp_n\text{-}D_n)$ corresponding to each other can be obtained through Steps 110-140. Using these energy spectrum-dose rates, the energy spectrum-dose conversion coefficient G is solved using the convolution-free full-spectrum conversion method of the present disclosure.

Since the energy spectrum is divided into n regions, the formula (5) is discretized, and the result is shown in the first expression (6):

$$\overset{g}{\dot{D}} = G_1 \cdot n_1 + G_2 \cdot n_2 + \ldots + G_n \cdot n_n \quad (6)$$

where Ḋ is a dose rate of the radiation source (X-ray/γ-ray); $G_1$ is an energy spectrum-dose conversion coefficient in the first energy region; $n_1$ is a counting rate of the energy spectrum of the radiation source (X-ray/γ-ray) in the first energy region, in which the counting rate refers to the counting per unit time. Because the counting information corresponding to different channels (energies) can be obtained through energy spectrum measurement, the ratio of counting to measuring live time is a counting rate corresponding to this channel (energy). For example, "the counting rate of the first energy region" refers to the sum of the corresponding counting rates of each energy in the first energy region. $G_n$ is an energy spectrum-dose conversion coefficient in the n-th energy region; $n_n$ is a counting rate of the energy spectrum of the radiation source (X-ray/γ-ray) in the n-th energy region.

The measured [energy spectrum-dose rate] data pair expressed in the first expression is converted to obtain the second expression, and the matrix form of the second expression is shown in Formula (7):

$$\begin{vmatrix} n_{1,1} & \ldots & n_{1,m} \\ M & O & M \\ n_{n,1} & \ldots & n_{n,m} \end{vmatrix} \cdot \begin{vmatrix} G_1 \\ M \\ G_n \end{vmatrix} = \begin{vmatrix} D_1 \\ M \\ D_m \end{vmatrix}. \quad (7)$$

Generally speaking, in order to ensure the stability of the solution, there is m≥n. For the convenience of discussion, m=n is taken.

Since after n groups of energy spectrum-dose values obtained in Steps 110-140 are arranged in ascending order of ray energy, the upper limit $E_i$ of each divided energy region is higher than the full-energy peak of the i-th ray, that is, in the energy spectrum of the i-th ray, the count (rate) at the position where the energy is higher than $E_i$ is 0. Therefore, the second expression is converted to obtain the third expression as shown in Formula (7), which can be written as follows:

$$\begin{vmatrix} n_{1,1} & & 0 \\ M & O & \\ n_{n,1} & \ldots & n_{n,n} \end{vmatrix} \cdot \begin{vmatrix} G_1 \\ M \\ G_n \end{vmatrix} = \begin{vmatrix} D_1 \\ M \\ D_n \end{vmatrix}. \quad (8)$$

By solving the third expression represented by the triangular matrix, the energy spectrum-dose conversion coefficient G can be obtained. The specific solution method is as follows.

(1) The solution of the first energy region (lowest energy region) is shown in Formula (9):

$$G_1 = \frac{\overset{g}{D_1}}{n_1} (E_0 \leq E \leq E_1) \quad (9)$$

where $G_1$ is an energy spectrum-dose conversion coefficient in the first energy region;

$$\overset{g}{D_1}$$

is a dose rate of the first radiation source; $n_1$ is a counting rate of the energy spectrum of the first radiation source in the first energy region; $E_0$ and $E_i$ are the starting and stopping energies of the first energy region, respectively.

(2) After the energy spectrum-dose conversion coefficient $G_1$ of the first energy region is obtained, the conversion coefficient of the second energy region is solved:

$$G_2 = \frac{\overset{g}{D_2} - G_1 \cdot n_{21}}{n_{22}} ((E_1 \leq E \leq E_2)) \quad (10)$$

where $G_2$ is an energy spectrum-dose conversion coefficient in the second energy region;

$$\overset{g}{D_2}$$

is a dose rate of the second radiation source; $n_{21}$ is a counting rate of the energy spectrum of the second radiation source in the first energy region; $n_{22}$ is a counting rate of the energy spectrum of the second radiation source in the second energy region; $E_1$ and $E_2$ are the starting and stopping energies of the second energy region, respectively.

(3) By analogy, the i-th energy spectrum-dose conversion coefficient G is solved as shown in Formula (11):

$$G_i = \frac{\overset{g}{D_i} - \sum_{j<i} G_j \cdot n_{ij}}{n_{ii}} ((E_{i-1} \leq E \leq E_i)) \quad (11)$$

where $G_1$ is an energy spectrum-dose conversion coefficient of the i-th region;

$$\overset{g}{D_i}$$

is a dose rate of the i-th radiation source; $n_{ij}$ is a counting rate of the i-th radiation source in the j-th region: $E_{i-1}$ and $E_i$ are the starting and stopping energies of the i-th energy region, respectively.

Figure 6:
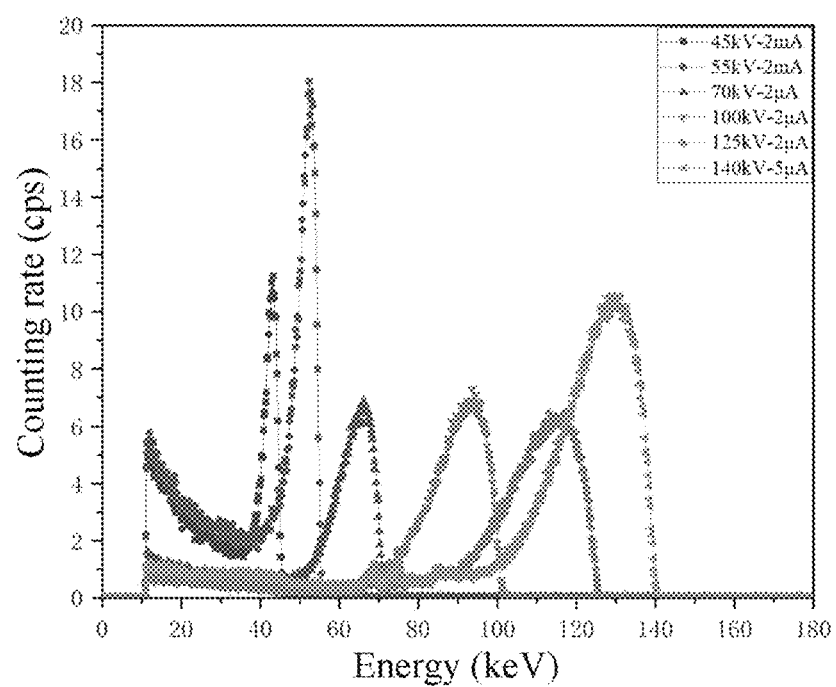
FIG. 6 is a schematic diagram of counting rate-energy.

(4) After traversing the n [energy spectrum-dose rate] data pairs, the energy spectrum-dose conversion coefficients G of n regions are finally solved. Based on the example in Steps 110-140 (the energy spectra and the dose rates of X-ray sources with tube voltages of 45 kV, 55 KV, 70 KV, 100 KV, 125 kV and 140 kV, and Cs-137 (0.662 MeV) and Co-60 (1.17 MeV and 1.33 MeV) γ-ray sources), the energy spectrum data of the example is shown in FIG. 6. In FIG. 6, the peak values of the counting rates correspond to the radiation sources with tube voltages of 45 KV, 55 KV, 70 KV, 100 kV, 125 kV and 140 kV.

Hereinafter, the construction of the G function will be explained by taking X-rays with tube voltages of 45 kV, 55 KV, 70 KV, 100 kV, 125 kV and 140 kV as examples.

(1) The solution of the first energy region (10 keV to 45 keV) is shown in Formula (12):

$$G_1 = \frac{\overset{g}{D_1}}{n_1} \quad (12)$$

where $G_1$ is an energy spectrum-dose conversion coefficient in the energy region of 10 keV to 45 keV;

$$\overset{g}{D_1}$$

is a dose rate of the X-ray source with the tube voltage of 45 kV; $n_1$ is a counting rate of the X-ray source with the tube voltage of 45 kV in the energy region of 10 keV to 45 keV.

(2) After the energy spectrum-dose conversion coefficient $G_1$ of the first energy region is obtained, the conversion coefficient of the second energy region (45 keV to 55 keV) is solved:

$$G_2 = \frac{\overset{g}{D_2} - G_1 \cdot n_{21}}{n_{22}} \tag{13}$$

where $G_2$ is an energy spectrum-dose conversion coefficient in the range of 45 keV to 55 keV;

$$\overset{g}{D_2}$$

is a dose rate of X-ray source with the tube voltage of 55 kV; $n_{21}$ is a counting rate of the X-ray source of 55 kV in the energy region of 10 keV to 45 keV; $n_{22}$ is a counting rate of the X-ray source of 55 kV in the energy region of 45 keV to 55 keV.

(3) By analogy, the energy spectrum-dose conversion coefficients G of eight regions are finally solved, and the eighth conversion coefficient G is solved as shown in Formula (14).

$$G_8 = \frac{\overset{g}{D_8} - (G_1 \cdot n_{81} + G_2 \cdot n_{82} + G_3 \cdot n_{83} + G_4 \cdot n_{84} + G_5 \cdot n_{85} + G_6 \cdot n_{86} + G_7 \cdot n_{87})}{n_{88}} \tag{14}$$

where $G_8$ is an energy spectrum-dose conversion coefficient in the energy region of 0.7 MeV to 3 MeV;

$$\overset{g}{D_8}$$

is a dose rate of Co-60 (1.17 MeV, 1.33 MeV) radiation source; $n_{81}, n_{82}, \ldots, n_{88}$ are counting rates of Co-60 radiation source in the energy regions of 10 keV to 45 keV, 45 keV to 55 keV, 55 keV to 70 keV, 70 keV to 100 keV, 100 keV to 125 keV, 125 keV to 140 keV, 140 keV to 0.7 MeV, and 0.7 MeV to 3 MeV, respectively.

In Step 160, the spectrometer is used to collect spectrum of the current radiation sources to obtain the current net energy spectra.

Through Steps 110-150, the process of solving the dose rate of the G function based on the convolution-free full-spectrum conversion method is constructed. In practical application, there is no need to solve the conversion coefficient for each operation, and the following operation steps can be directly carried out.

Specifically, the environmental background spectrum is measured by the spectrometer, and the background spectrum is denoted as $sp_b$. Thereafter, the energy spectrum of the radioactive field is measured by the spectrometer, the measured energy spectrum is denoted as $sp_r$, and finally the net energy spectra information is obtained: $sp=sp_r-sp_b$. There is no need to perform energy calibration on the used spectrometer, and the energy calibration coefficient in Step 110 can be directly used.

In Step 170, the current net energy spectrum is divided according to the n regions to obtain the counting rate of each region, and the current dose rate of each region is calculated according to the energy spectrum-dose function and the counting rate of each region.

Specifically; the obtained net energy spectra is divided according to the energy regions in Step 120, and the counting rates of respective regions are summed to obtain $n_1, n_2, \ldots, n_n$. Since the G function value of each energy region has been obtained in Steps 110-150, the dose rate of the energy region is obtained by multiplying the G function value of the corresponding energy region with the counting rate n.

In step 180, a full-spectrum dose rate is calculated according to the current dose rate of each region.

Specifically; the solution of the full-spectrum dose rate is to add the dose rates of n regions to obtain the full-spectrum dose rate. The full-spectrum dose rate can be obtained by summing the dose rates of respective energy regions, and the solution formula is shown in Formula (6).

The above-mentioned method for solving the conversion coefficient G can be referred to as the convolution-free full-spectrum conversion method, which contains three-level meanings.

a. Microscopically, on the basis of Steps 110-140, the process of Step 150 is referred to as a core step of the convolution-free full-spectrum conversion method.

b. Macroscopically, the process of solving the conversion coefficient G in Steps 110-150 is referred to as the convolution-free full-spectrum conversion method.

c. On the application level, on the basis of Steps 110-150, Steps 160-180 apply the conversion coefficient G solved using the convolution-free full-spectrum conversion method to the actual measurement of the environmental radiation dose (rate), that is, the device for obtaining the conversion coefficient G based on the convolution-free full-spectrum conversion method and an application thereof.

In the present disclosure, since the convolution-free full-spectrum conversion method requires a series of energy spectra and corresponding dose rates, accurate measurement of energy spectra and dose rates and the solution process of the conversion coefficient G in Step 150 have become one of the key points to be protected in the present disclosure. The present disclosure acquires the γ energy spectrum and the dose rate under the standard γ radiation field. On the basis of L-series X-ray standard field, a heavier filter is constructed to realize the accurate acquisition of the X-ray energy spectrum and the dose rate.

Figure 7:
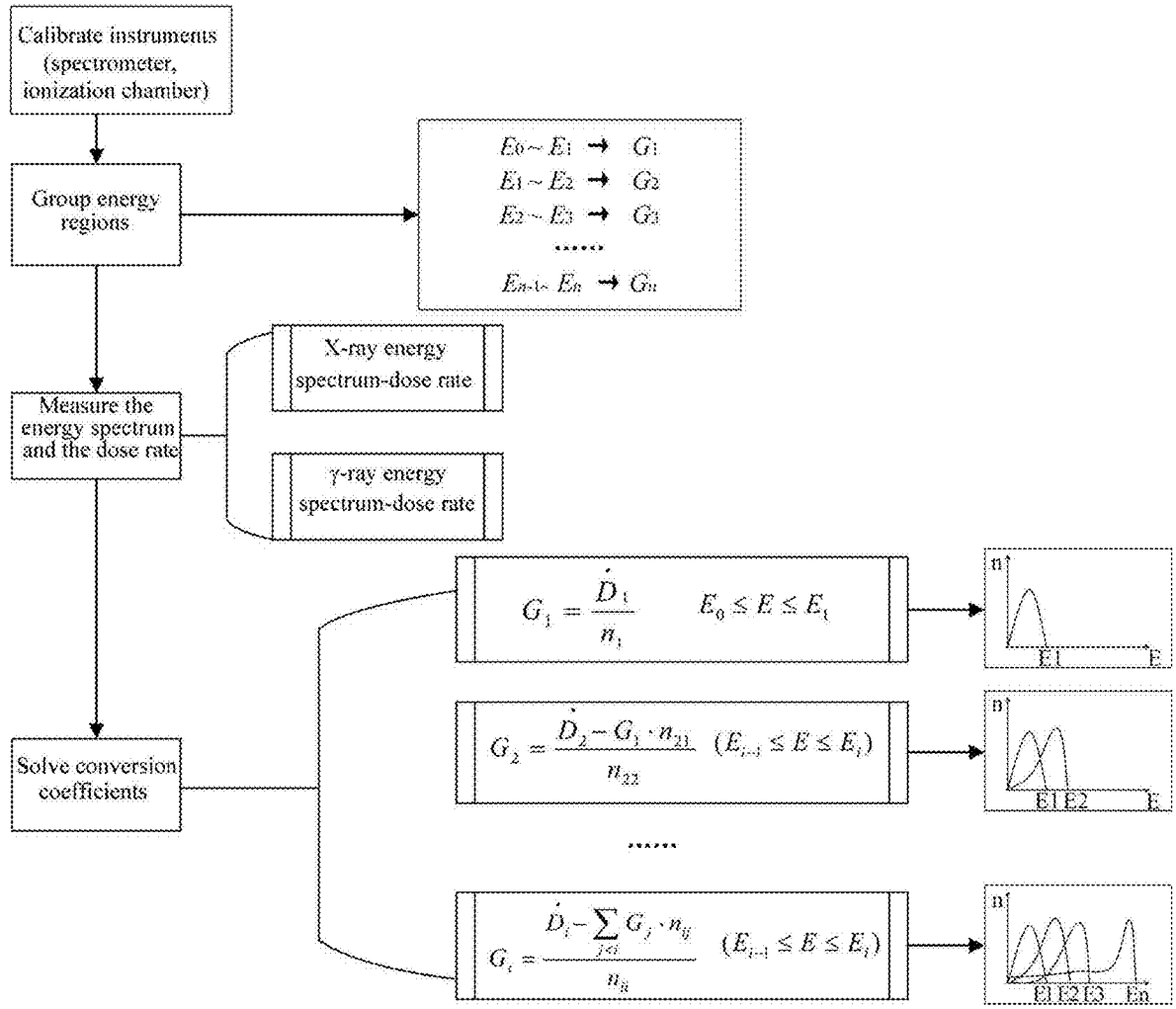
FIG. 7 is a flow chart of an energy spectrum-dose measuring method in a specific application according to the present disclosure.

FIG. 7 is a specific embodiment of the present disclosure, as shown in FIG. 7, including the following steps 710-740.

In Step 710, the instrument is calibrated.

The spectrometer and the ionization chamber are calibrated. The calibration factor of the spectrometer is obtained by calibrating the spectrometer, and the calibration factor of the ionization chamber is obtained by calibrating the ionization chamber.

In Step 720, the energy regions are grouped.

The energy regions are grouped to obtain n energy regions.

In Step 730, the energy spectrum and the dose rate are measured.

The X-ray energy spectrum-dose rate can be measured, and the γ-ray energy spectrum-dose rate can be measured.

In Step 740, the conversion coefficient is solved.

Referring to Step 150, the energy spectrum-dose conversion coefficient can be solved.

By applying the energy spectrum-dose measuring method according to the present disclosure, the energy spectrum-dose conversion coefficient is solved using a convolution-free full-spectrum conversion method. Considering that the counting rates of different energies have different weights on the dose rate, the energy of the energy spectrum is divided to solve the conversion coefficient, which effectively improves the energy response problem in the dose test of spectrometer detectors. There is no need to perform deconvolution on the energy spectrum, which greatly reduces the calculation time and improves the calculation efficiency: The convolution-free full-spectrum conversion method is used to solve the energy spectrum-dose conversion coefficient, which solves the problems of an unstable solution result and non-convergence. Moreover, the solution result of the dose rate is not limited by complex environmental conditions, and has a wider applicability.

Embodiment 2

Figure 8:
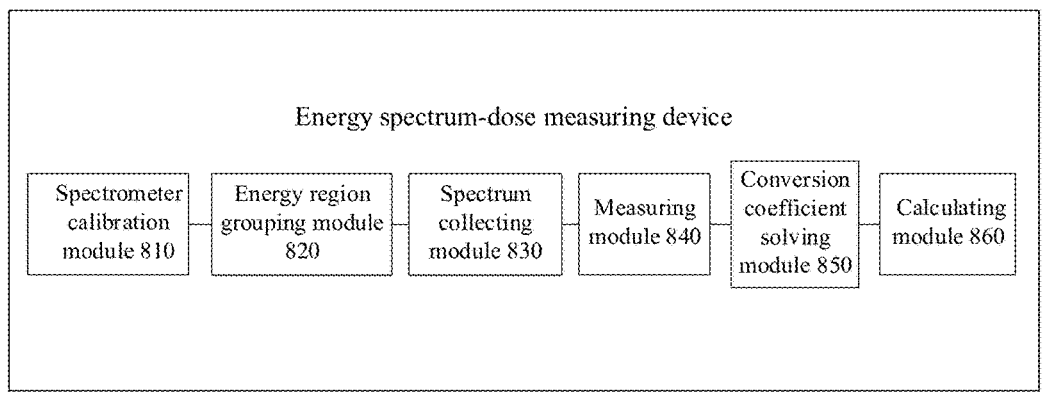
FIG. 8 is a schematic structural diagram of an energy spectrum-dose measuring device according to Embodiment 2 of the present disclosure.

FIG. 8 is a schematic structural diagram of an energy spectrum-dose measuring device according to Embodiment 2 of the present disclosure. Referring to FIG. 8, the energy spectrum-dose measuring device includes a spectrometer calibration module 810, an energy region grouping module 820, a spectrum collection module 830, a measuring module 840, a conversion coefficient solving module 850 and a calculating module 860.

The spectrometer calibration module 810 is configured to perform energy calibration on a spectrometer using a standard radiation source to obtain a conversion relation between a channel and the energy, where the conversion relation is represented by a calibration factor.

The energy region grouping module 820 is configured to measure ray peaks of n radiation sources with different energies, and divide energy of an obtained energy spectrum into n regions, where each region at least has a full-energy peak of one ray; and n is the number of radiation sources with different energies.

The spectrum collection module 830 is configured to perform spectrum collection on the n radiation sources according to the n regions to obtain n net energy spectra subjected to the energy calibration through the calibration factor.

The measuring module 840 is configured to perform dose measurement on the n radiation sources sequentially to obtain n dose rates corresponding to the n net energy spectra.

The conversion coefficient solving module 850 is configured to calculate a relationship between counting rates of the radiation sources in the n regions and corresponding dose rates, where the relationship includes n energy spectrum-dose conversion coefficients to construct an energy spectrum-dose function.

Further, the spectrum collection module 830 is further configured to perform spectrum collection on the current radiation source using the spectrometer to obtain the current net energy spectrum.

The energy region grouping module 820 is further configured to divide the current net energy spectrum according to the n regions to obtain the counting rate of each region, and calculate the current dose rate of each region according to the energy spectrum-dose function and the counting rate of each region.

The calculating module 860 is configured to calculate a full-spectrum dose rate according to the current dose rate of each region.

Those skilled in the art should further realize that the units and algorithm steps of each example described in connection with the embodiments disclosed herein can be implemented in electronic hardware, computer software or a combination thereof. In order to clearly illustrate the interchangeability of hardware and software, the components and steps of each example have been generally described by function in the above description. Whether these functions are implemented in hardware or software depends on the specific application and design constraints of the technical scheme. Those skilled in the art can use different methods to implement the described functions for each specific application, but this implementation should not be considered beyond the scope of the present disclosure.

The steps of a method or algorithm described in connection with the embodiments disclosed herein may be implemented in hardware, a software module executed by a processor, or a combination thereof. The software module can be placed in a random access memory (RAM), a memory, a read-only memory (ROM), an electrically programmable ROM, an electrically erasable programmable ROM, a register, a hard disk, a removable disk, an CD-ROM, or storage medium in other forms known in the technical field.

The above specific embodiments have further explained the purpose, technical scheme and beneficial effects of the present disclosure in detail. It should be understood that the above are only specific embodiments of the present disclosure, rather than limit the scope of protection of the present disclosure. Any modification, equivalent substitution, improvement, etc. made within the spirit and principle of the present disclosure should be included in the scope of protection of the present disclosure.

What is claimed is:

1. An energy spectrum-dose measuring method, comprising:
    performing energy calibration on a spectrometer using a standard radiation source to obtain a conversion relation between a channel and an energy, wherein the conversion relation is represented by a calibration factor;
    measuring ray peaks of n radiation sources with different energies, and dividing energy of an obtained energy spectrum into n regions, wherein each region at least has a full-energy peak of one ray, and n is a number of radiation sources with different energies;
    performing spectrum collection on the n radiation sources according to the n regions to obtain n net energy spectra subjected to the energy calibration through the calibration factor;
    performing dose measurement on the n radiation sources sequentially to obtain n dose rates corresponding to the n net energy spectra; and
    calculating a relationship between counting rates of the radiation sources in the n regions and corresponding dose rates, wherein the relationship comprises n energy spectrum-dose conversion coefficients to construct an energy spectrum-dose function.

2. The method according to claim 1, further comprising:
    performing spectrum collection on a current radiation source using the spectrometer to obtain a current net energy spectrum;
    dividing the current net energy spectrum according to the n regions to obtain a counting rate of each region, and calculating a current dose rate of each region according to the energy spectrum-dose function and the counting rate of each region; and calculating a full-spectrum dose rate according to the current dose rate of each region.

3. The method according to claim 1, wherein the performing spectrum collection on the n radiation sources according to the n regions to obtain n net energy spectra subjected to the energy calibration through the calibration factor comprises:
selecting n radiation sources corresponding to different X-ray tube voltages, performing background spectrum collection on an environment using the spectrometer to obtain n background spectra, and performing spectrum collection on the n radiation sources using the spectrometer to obtain energy spectra of the n radiation sources;
obtaining the n net energy spectra according to differences between the energy spectra of the n radiation sources and the n background spectra.

4. The method according to claim 3, wherein the calculating dose rates of the n radiation sources comprises:
measuring an accumulated charge in a predetermined time for each of the n radiation sources through a cavity ionization chamber;
calculating an ionization current according to a relationship between the accumulated charge and the predetermined time;
calculating the dose rates according to a relationship between the ionization current and a calibration factor of the ionization chamber.

5. The method according to claim 4, wherein the solving the third expression to obtain the n energy spectrum-dose conversion coefficients comprises:
solving a current energy spectrum-dose conversion coefficient based on previous energy spectrum-dose conversion coefficients, until an n-th energy spectrum-dose conversion coefficient is obtained.

6. The method according to claim 1, wherein prior to the calculating a relationship between counting rates of the radiation sources in the n regions and corresponding dose rates, wherein the relationship comprises n energy spectrum-dose conversion coefficients, the method further comprises:
calculating dose rates of the n radiation sources.

7. The method according to claim 1, wherein the calculating a relationship between counting rates of the radiation sources in the n regions and corresponding dose rates, wherein the relationship comprises n energy spectrum-dose conversion coefficients to construct an energy spectrum-dose function, comprises:
performing discretization processing on the dose rates, the counting rates and the energy spectrum-dose conversion coefficients, which is represented as a first expression for solving the n energy spectrum-dose conversion coefficients;
converting the first expression to obtain a second expression;
converting the second expression according to the counting rates to obtain a third expression;
solving the third expression to obtain the n energy spectrum-dose conversion coefficients.

8. An energy spectrum-dose measuring device, comprising:
a spectrometer calibration module, configured to perform energy calibration on a spectrometer using a standard radiation source to obtain a conversion relation between a channel and an energy, wherein the conversion relation is represented by a calibration factor;
an energy region grouping module, configured to measure ray peaks of n radiation sources with different energies, and divide energy of an obtained energy spectrum into n regions, wherein each region at least has a full-energy peak of one ray, and n is a number of radiation sources with different energies;
a spectrum collection module, configured to perform spectrum collection on the n radiation sources according to the n regions to obtain n net energy spectra subjected to the energy calibration through by the calibration factor;
a measuring module, configured to perform dose measurement on the n radiation sources sequentially to obtain n dose rates corresponding to the n net energy spectra;
a conversion coefficient solving module, configured to calculate a relationship between counting rates of the radiation sources in the n regions and corresponding dose rates, wherein the relationship comprises n energy spectrum-dose conversion coefficients to construct an energy spectrum-dose function.

9. The device according to claim 8, wherein
the spectrum collection module is further configured to perform spectrum collection on a current radiation source using the spectrometer to obtain a current net energy spectrum;
the energy region grouping module is further configured to divide the current net energy spectrum according to the n regions to obtain a counting rate of each region, and calculate a current dose rate of each region according to the energy spectrum-dose function and the counting rate of each region; and
the device further comprises a calculating module, configured to calculate a full-spectrum dose rate according to the current dose rate of each region.

* * * * *